US009020681B2

(12) United States Patent
Krupansky et al.

(10) Patent No.: US 9,020,681 B2
(45) Date of Patent: Apr. 28, 2015

(54) DISPLAY OF NAVIGATION LIMITS ON AN ONBOARD DISPLAY ELEMENT OF A VEHICLE (75) Inventors: Petr Krupansky, Veverska Bityska (CZ); Jiri Vasek, Brno (CZ); Pavel Kolcarek, Brno (CZ); Tomas Neuzil, Brno (CZ); John A. Wise, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 532 days.

(21) Appl. No.: 12/796,497

(22) Filed: Jun. 8, 2010

(65) Prior Publication Data

US 2011/0301842 A1     Dec. 8, 2011

(51) Int. Cl.
G05D 1/00       (2006.01)
G01C 21/00      (2006.01)
G01C 23/00      (2006.01)

(52) U.S. Cl.
CPC .............. G01C 21/00 (2013.01); G01C 23/00 (2013.01)

(58) Field of Classification Search
USPC ............. 701/1, 4, 9, 117, 200, 201, 204, 207, 701/209, 210, 418; 342/174, 458; 340/970; 235/462.46
See application file for complete search history.

(56) References Cited

U.S. PATENT DOCUMENTS

| 4,086,632 | A | * | 4/1978 | Lions | 701/418 |
| 5,406,063 | A | * | 4/1995 | Jelen | 235/462.46 |
| 6,154,151 | A | | 11/2000 | McElreath et al. | |
| 6,266,583 | B1 | * | 7/2001 | Tazartes et al. | 701/4 |
| 6,389,355 | B1 | | 5/2002 | Gibbs et al. | |
| 6,463,382 | B1 | * | 10/2002 | Bullock | 701/117 |
| 6,505,102 | B2 | | 1/2003 | Morizet et al. | |
| 6,720,891 | B2 | | 4/2004 | Chen et al. | |
| 6,934,608 | B2 | | 8/2005 | Qureshi | |
| 7,237,747 | B1 | | 7/2007 | Baudry | |
| 7,603,209 | B2 | | 10/2009 | Dwyer et al. | |

(Continued)

FOREIGN PATENT DOCUMENTS

| CN | 101203731 A | 6/2008 |
| EP | 2184585 A2 | 5/2010 |
| EP | 2184585 A3 | 7/2010 |

OTHER PUBLICATIONS

EP Communication, EP Application No. 11 168 303.3-1236 dated Oct. 28, 2011.

(Continued)

*Primary Examiner* — James Trammell
*Assistant Examiner* — Sanjeev Malhotra
(74) *Attorney, Agent, or Firm* — Ingrassia Fisher & Lorenz, P.C.

(57) ABSTRACT

A method of displaying navigation limits for a planned travel route of a vehicle is presented here. The method calculates estimated navigation limits for the vehicle using an onboard subsystem of the vehicle, where the estimated navigation limits represent self-assessed navigation accuracy of the vehicle relative to the planned travel route. Contracted navigation limits are acquired for the vehicle, where the contracted navigation limits represent specified navigation accuracy of the vehicle, relative to the planned travel route, as mandated by a third party navigation controller. A navigation display is rendered on an onboard display element such that it includes graphical representations of the planned travel route, at least one of the estimated navigation limits, and at least one of the contracted navigation limits.

16 Claims, 9 Drawing Sheets

(56) References Cited

U.S. PATENT DOCUMENTS

| | | | |
|---|---|---|---|
| 7,606,658 B2 | 10/2009 | Wise et al. | |
| 7,650,232 B1 | 1/2010 | Paielli | |
| 2002/0097184 A1* | 7/2002 | Mayersak | 342/458 |
| 2002/0120388 A1* | 8/2002 | Bullock | 701/117 |
| 2003/0195672 A1 | 10/2003 | He | |
| 2004/0049341 A1* | 3/2004 | Fujiwara | 701/210 |
| 2004/0111192 A1* | 6/2004 | Naimer et al. | 701/9 |
| 2004/0160341 A1* | 8/2004 | Feyereisen et al. | 340/970 |
| 2005/0049763 A1* | 3/2005 | Walsdorf et al. | 701/9 |
| 2006/0004496 A1 | 1/2006 | Tucker et al. | |
| 2006/0155427 A1* | 7/2006 | Yang | 701/1 |
| 2007/0021905 A1* | 1/2007 | Takashima et al. | 701/201 |
| 2007/0219705 A1* | 9/2007 | Bitar et al. | 701/200 |
| 2008/0059057 A1* | 3/2008 | Tengler et al. | 701/204 |
| 2008/0143585 A1* | 6/2008 | Thomas et al. | 342/174 |
| 2008/0228333 A1 | 9/2008 | De Menorval et al. | |
| 2009/0157303 A1* | 6/2009 | Clark et al. | 701/207 |
| 2009/0177387 A1* | 7/2009 | Liu | 701/209 |
| 2009/0267800 A1 | 10/2009 | Hammack et al. | |
| 2010/0114406 A1 | 5/2010 | DeJonge et al. | |

OTHER PUBLICATIONS

Krupansky, P., Kolcarek, P., Svoboda, J., Vasek, J.; Concept of Airborne Trajectory Prediction Uncertainty Management and Displaying; 2009 Modern Safety Technologies In Transportation Conference; <URL:http://www.mosatt.org/archiv/mosatt2009/zbornik/proc1.png>.

EP Search Report, EP 11168303.3-1236 dated Jul. 10, 2011.

CN Office Action for Application 201110204469.3 dated Dec. 24, 2014.

* cited by examiner

DISPLAY OF NAVIGATION LIMITS ON AN ONBOARD DISPLAY ELEMENT OF A VEHICLE

TECHNICAL FIELD

Embodiments of the subject matter described herein relate generally to display systems for vehicles such as aircraft. More particularly, embodiments of the subject matter relate to a navigation display that includes visual representations of self-assessed and contracted navigation limits relative to an intended route of travel.

BACKGROUND

Modern flight deck displays for vehicles (such as aircraft or spacecraft) display a considerable amount of information, such as vehicle position, speed, altitude, attitude, navigation, target, and terrain information. In the case of an aircraft, most modern displays additionally display a flight plan from different views, either a lateral (top-down) view, a vertical profile view, or a perspective view, which can be displayed individually or simultaneously on the same display.

A navigation display of an aircraft typically includes visual representations of the aircraft, the intended trajectory or flight path, waypoints along the flight path, and the like. The flight crew consults the navigation display and other flight deck instrumentation during flight to confirm that the aircraft is adhering to the flight plan. In this regard, modern flight planning and air traffic management technologies and protocols often call for accurate trajectory prediction and strict adherence to the flight plan. For example, it is often expected that the four-dimensional trajectory (which contemplates geographic position and time) of an aircraft will be followed within certain tolerance ranges or boundaries, and it may be desirable for an aircraft to remain within a lateral range of about one nautical mile, relative to the planned flight path. As another example, it may be desirable for an aircraft to remain within an altitude range of about five hundred feet, relative to the planned flight path. These and possibly other navigation limits could be self-imposed by the aircraft, mandated by a governing authority, specified by air traffic control, or the like.

Conventional display systems for aircraft do not display four-dimensional navigation limits, which may be self-imposed or designated and contracted by a third party. Accordingly, it is desirable to have a display system for aircraft and other vehicles that addresses the shortcomings of conventional display systems and related display formats.

BRIEF SUMMARY

A method of displaying navigation limits for a planned travel route of a vehicle is provided. The method calculates estimated navigation limits for the vehicle using an onboard subsystem of the vehicle. The estimated navigation limits represent self-assessed navigation accuracy of the vehicle relative to the planned travel route. The method also acquires contracted navigation limits for the vehicle. The contracted navigation limits represent specified navigation accuracy of the vehicle, relative to the planned travel route, as mandated by a third party navigation controller. The method continues by rendering, on the onboard display element, a navigation display comprising graphical representations of the planned travel route, at least one of the estimated navigation limits, and at least one of the contracted navigation limits.

Also provided is a method of displaying navigation limits on an onboard display element of an aircraft. This method may begin by obtaining a planned trajectory for the aircraft. The method continues by calculating, with an onboard subsystem of the aircraft and in response to current operating conditions and performance characteristics of the aircraft, estimated navigation limits for the aircraft. The estimated navigation limits represent self-assessed navigation accuracy of the aircraft relative to the planned trajectory. The method also displays, on the onboard display element, a graphical representation of the planned trajectory and graphical representations of the estimated navigation limits.

Another method of displaying navigation limits on an onboard display element of an aircraft is provided. This method may being by obtaining a planned trajectory for the aircraft. The method continues by acquiring contracted navigation limits for the aircraft that represent desired navigation accuracy of the aircraft, relative to the planned trajectory, as specified by a third party navigation controller. The method continues by displaying, on the onboard display element, a graphical representation of the planned trajectory and graphical representations of the contracted navigation limits.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Navigation displays for vehicles (such as aircraft) can be used to display the planned travel path, flight plan, trajectory, or route, along with other graphical indicia. Some navigation displays include graphical representations of navigation boundaries that indicate preferred, desirable, mandatory, or other limits relative to the planned travel path. For example, a vertical profile display might show the planned flight trajectory along with a maximum altitude restriction and/or a minimum altitude restriction. These restrictions could represent specified altitudes or an allowable range of altitudes relative to the planned flight trajectory. As another example, a lateral display might depict the planned flight track along with allowable lateral boundaries or limits.

Modern air traffic management concepts and technologies (e.g., those proposed by the Single European Sky ATM Research (SESAR) project) call for more accurate trajectory prediction of aircraft and adherence to flight plans. In this regard, it is desirable to execute the four-dimensional trajectory (which contemplates three-dimensional geographic position and time) of an aircraft within certain navigational boundaries. Modern air traffic management approaches assume that four-dimensional limits (e.g., lateral cross-track limits, altitude limits, and temporal limits) will be governed or otherwise influenced by air traffic control (ATC), in cooperation with the pilot or flight crew. In accordance with the embodiments described herein, the four-dimensional limits associated with an aircraft having a planned flight trajectory are graphically displayed during the flight. The four-dimensional limits may include performance-based limits that are self-assessed by the aircraft in an ongoing manner during flight and/or controlled limits that are negotiated with, contracted by, or otherwise designated by some entity, agency, or system other than the aircraft (e.g., ATC).

It should be appreciated that the techniques, concepts, and display technology described here need not be limited to aircraft or spacecraft. Indeed, the subject matter presented here can be modified as needed for other vehicle applications including, without limitation: automobiles; motorcycles; lighter-than-air vehicles; watercraft; human-powered vehicles such as bicycles; and the like. Moreover, the subject matter described here could be utilized in conjunction with some non-vehicle applications such as, without limitation: handheld navigation devices; portable electronic devices having navigation display capabilities; electronic pedometers; mobile computing devices; and the like.

Figure 1:
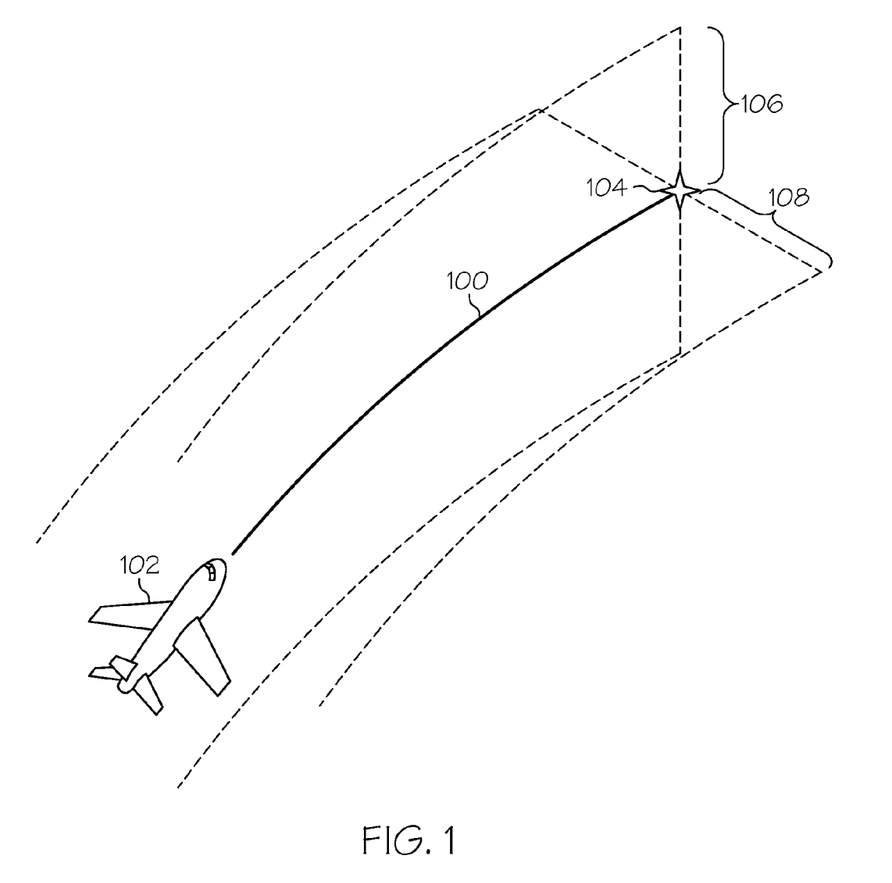
FIG. 1 is a diagram that illustrates a flight trajectory to a waypoint, along with altitude and cross-track navigation limits associated therewith.

FIG. 1 is a diagram that illustrates a planned flight trajectory 100 of an aircraft 102. FIG. 1 depicts a portion of the planned flight trajectory 100 that leads to a waypoint 104. The planned flight trajectory 100 represents the intended or ideal travel path of the aircraft 102. In reality, the aircraft 102 will divert from the planned flight trajectory 100 (due to operating conditions, weather conditions, the navigational capabilities and limitations of the aircraft 102, and other factors). FIG. 1 also depicts limits associated with the planned flight trajectory 100. The limits may be derived from safety margins provided by ATC, aircraft navigation and guidance capabilities, and/or other factors. For this example, an upper altitude limit 106 represents a desired altitude constraint for the aircraft 102, and a starboard cross-track limit 108 represents a desired lateral constraint for the aircraft 102. Although not separately labeled in FIG. 1, the aircraft 102 is also subject to a lower altitude limit and a port cross-track limit.

The planned flight trajectory 100 is four-dimensional in that the aircraft 102 is expected to reach the waypoint 104 at a specified time or within a specified period of time. In this regard, the waypoint 104 could have an ideal arrival time associated therewith, and a temporal limit that contemplates allowable deviations in the ideal arrival time. Accordingly, a temporal limit corresponding to the waypoint 104 may be, for example: +5 seconds; −7 seconds; ±6 seconds; or any temporal range relative to the ideal arrival time. Alternatively, a temporal limit could be expressed in terms of the allowable arrival time, e.g., between 10:34:13 and 10:34:22.

Figure 2:
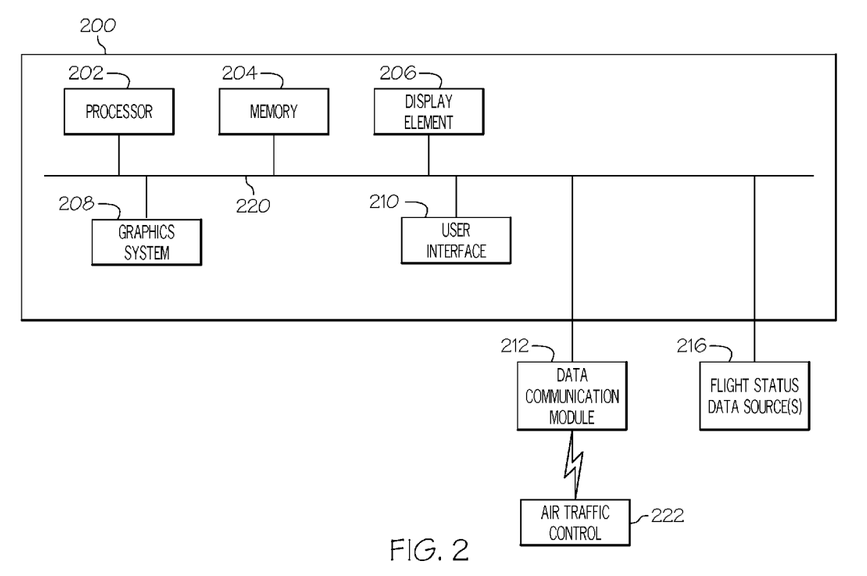
FIG. 2 is a schematic block diagram representation of an exemplary embodiment of a display system for a vehicle such as an aircraft.

FIG. 2 is a schematic block diagram representation of an exemplary embodiment of a display system 200 for a vehicle such as an aircraft. In exemplary embodiments, the display system 200 is located onboard the host aircraft, i.e., the various components and elements of the display system 200 reside within the host aircraft, are carried by the host aircraft, or are attached to the host aircraft. The illustrated embodiment of the display system 200 includes, without limitation: at least one processor 202; an appropriate amount of memory 204; a display element 206; a graphics system 208; a user interface 210; a data communication module 212; and at least one source of flight status data 216. These elements of the display system 200 may be coupled together by a suitable interconnection architecture 220 that accommodates data communication, the transmission of control or command signals, and/or the delivery of operating power within the display system 200. It should be understood that FIG. 2 is a simplified representation of the display system 200 that will be used for purposes of explanation and ease of description, and that FIG.

2 is not intended to limit the application or scope of the subject matter in any way. In practice, the display system 200 and the host aircraft will include other devices and components for providing additional functions and features, as will be appreciated in the art. Furthermore, although FIG. 2 depicts the display system 200 as a single unit, the individual elements and components of the display system 200 could be implemented in a distributed manner using any number of physically distinct pieces of hardware or equipment.

The processor 202 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor 202 obtains and processes current flight status data of the host aircraft, geographic position data that indicates the location of the host aircraft, and self-assessed operational and/or performance data of the host aircraft to generate and render navigation display features in an appropriate manner.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC. In practice, a functional or logical module/component of the display system 200 might be realized using program code that is maintained in the memory 204. For example, the graphics system 208 or the data communication module 212 may have associated software program components that are stored in the memory 204. Moreover, the memory 204 can be used to store data utilized to support the operation of the display system 200, as will become apparent from the following description.

The display element 206 is usually located within a cockpit of the host aircraft. It will be appreciated that although FIG. 2 shows a single display element 206, in practice, additional display devices may be present onboard the host aircraft. In an exemplary embodiment, the display element 206 is coupled to the graphics system 208, which is coupled to the processor 202 such that the processor 202 and the graphics system 208 cooperate to display, render, or otherwise convey one or more graphical representations, synthetic displays, graphical icons, visual symbology, or images associated with operation of the host aircraft on the display element 206, as described in greater detail below. An embodiment of the display system 200 may utilize existing graphics processing techniques and technologies in conjunction with the graphics system 208. For example, the graphics system 208 may be suitably configured to support well known graphics technologies such as, without limitation, VGA, SVGA, UVGA, or the like.

In an exemplary embodiment, the display element 206 is realized as an electronic display configured to graphically display flight information or other data associated with operation of the host aircraft under control of the graphics system 208. In this regard, the display element 206 may be, for example, a light emitting diode (LED) display or a cathode ray tube (CRT) display. In alternate embodiments, different display technologies, equipment, and architectures could be utilized, such as, without limitation: heads-up display technology; near-eye displays; virtual displays; liquid crystal display (LCD) technology; flat panel displays; projector display technology; three-dimensional display technology; etc. In practice, the processor 202 and/or the graphics system 208 produces image rendering display commands that are received by the display element 206 for purposes of rendering the navigation display.

The illustrated embodiment of the display system 200 includes a user interface 210, which is suitably configured to receive input from a user (e.g., a pilot) and, in response to the user input, supply appropriate command signals to the processor 202. The user interface 210 may be any one, or any combination, of various known user interface devices or technologies, including, but not limited to: a cursor control device such as a mouse, a trackball, or joystick; a keyboard; buttons; switches; or knobs. Moreover, the user interface 210 may cooperate with the display element 206 and the graphics system 208 to provide a graphical user interface. Thus, a user can manipulate the user interface 210 by moving a cursor symbol rendered on the display element 206, and the user may use a keyboard to, among other things, input textual data. For example, the user could manipulate the user interface 210 to enable/disable the display of navigation limits, to change display modes for navigation limits, or the like.

In an exemplary embodiment, the data communication module 212 is suitably configured to support data communication between the host aircraft and one or more remote systems. For example, the data communication module 212 may be designed and configured to enable the host aircraft to communicate with an ATC 222. In this regard, the data communication module 212 may include or support a datalink subsystem that can be used to provide ATC data to the host aircraft and/or to send information from the host aircraft to the ATC 222, preferably in compliance with known standards and specifications. For example, the pilot (or other flight crew member) can communicate with the ATC 222 using the data communication module 212 to negotiate, discuss, and obtain navigation limits associated with the current flight plan. In certain implementations, the data communication module 212 is also used to communicate with other aircraft that are near the host aircraft. For example, the data communication module 212 may be configured for compatibility with Automatic Dependant Surveillance-Broadcast (ADS-B) technology, with Traffic and Collision Avoidance System (TCAS) technology, and/or with similar technologies.

In operation, the display system 200 is also configured to process the current flight status data for the host aircraft. In this regard, the sources of flight status data 216 generate, measure, and/or provide different types of data related to the operational status of the host aircraft, the environment in which the host aircraft is operating, flight parameters, and the like. In practice, the sources of flight status data 216 can be represented by multiple avionics systems which may include line replaceable units (LRUs), transducers, accelerometers, instruments, sensors, GPS units, Flight Management Systems (FMS), and other well known devices. The data provided by the sources of flight status data 216 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; measurement of the navigation accuracy of the host aircraft, relative to the planned travel route or flight trajectory; etc. Thus, data provided by the sources of flight status data 216 may be used to determine, indicate, or measure a performance capability or metric of the aircraft, such as navigation accuracy. In practice, the aircraft is capable of assessing its navigation accuracy during flight (in a continuous or virtually real-time manner, periodically, or on any desired time schedule during the flight).

The display system 200 is suitably designed to process data obtained from the sources of flight status data 216 in the manner described in more detail herein. In particular, the display system 200 can use the flight status data of the host aircraft when rendering navigation displays.

Figure 3:
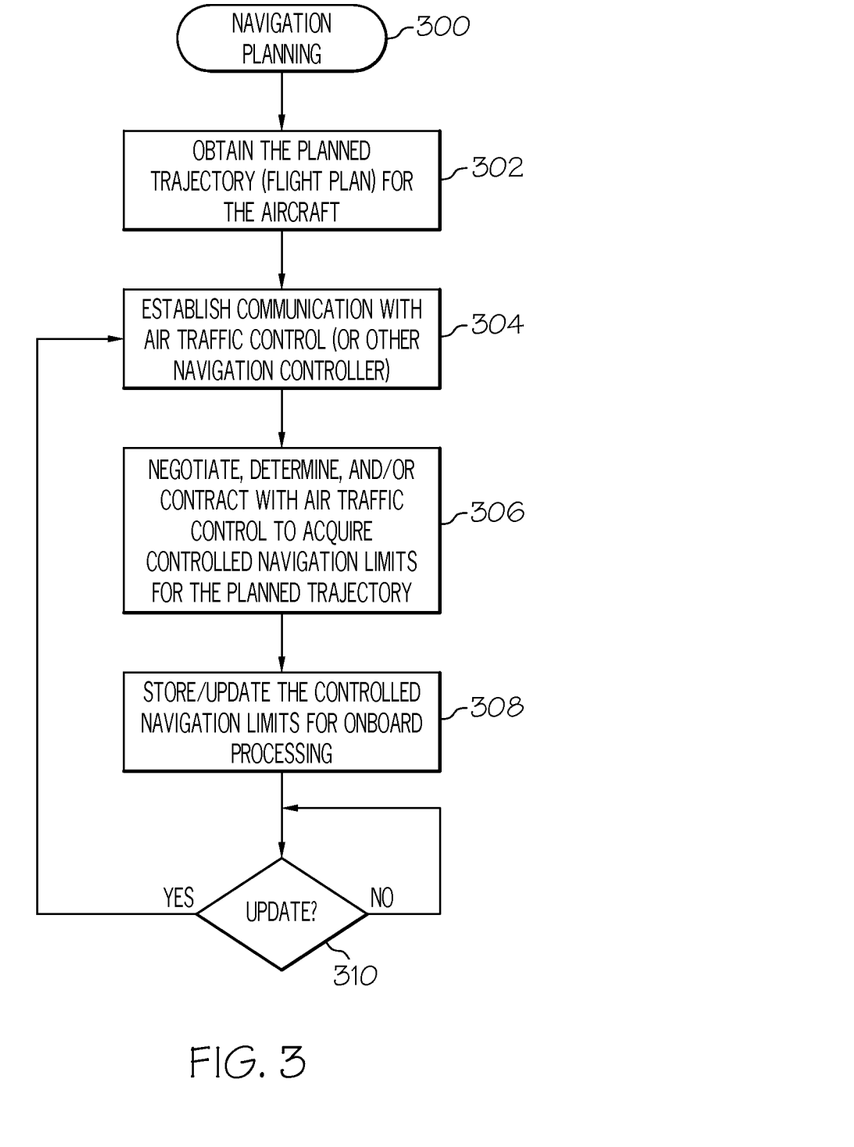
FIG. 3 is a flow chart that illustrates an exemplary embodiment of a navigation planning process.

The display system 200 supports the generation and rendering of navigation displays that include graphical representations of one or more navigation limits associated with a planned flight trajectory. In certain embodiments, a navigation display includes visual representations of at least two different types of navigation limits: estimated navigation limits that represent self-assessed navigation accuracy of the aircraft; and contracted navigation limits that represent specified, desired, mandated, negotiated, and/or contracted navigation accuracy. As one non-limiting example, contracted navigation limits can be altitude, cross-track, or temporal limits that are dictated by the ATC. In this regard, FIG. 3 is a flow chart that illustrates an exemplary embodiment of a navigation planning process 300 that could be used to initialize or otherwise configure a display system (such as the display system 200) so that the display system can display navigation limits in the manner described in more detail below. The various tasks performed in connection with process 300 may be performed by software, hardware, firmware, or any combination thereof. For illustrative purposes, the following description of process 300 may refer to elements mentioned above in connection with FIGS. 1 and 2. In practice, portions of process 300 may be performed by different elements of the described system, e.g., a processor, a display element, or a data communication module. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The process 300 may begin by obtaining the planned, desired, or intended travel route (e.g., the flight trajectory or flight plan) for the aircraft (task 302). An appropriate subsystem onboard the aircraft can obtain the planned travel route using wireless data communication technology, from a portable data storage device carried by the pilot or a member of the flight crew, via manual data entry, or the like. In practice, the planned travel route can be obtained and stored in any suitable electronic format such that it can be used to generate a graphical representation of the track, trajectory, or flight path of the aircraft as needed. One or more onboard subsystems or components can then be used to establish communication with the ATC or some other third party navigation controller, entity, agency, or service (task 304). As an example, the pilot or another member of the flight crew could use an onboard communication system, a mobile telephone, a wireless computing device, a short range radio, and/or other communication platforms during task 304. During this communication session, the pilot or flight crew may negotiate, determine, or otherwise resolve certain navigation limits to be applied to the planned travel route (task 306). For example, the pilot or flight crew could negotiate with, contract with, and/or have relevant discussions with the ATC to acquire contracted four-dimensional navigation limits that represent desired navigation accuracy of the aircraft, relative to the planned travel route. As used here, a "contracted navigation limit" is a navigation related parameter, specification, time, measurement, metric, or boundary that the aircraft agrees to satisfy during flight. Thus, the aircraft is manually and/or automatically controlled in an active manner such that it maneuvers within any navigational tolerances established by contracted navigation limits. In this context, it may be (and usually is) possible for the aircraft to satisfy navigation limits that are tighter or stricter than contracted navigation limits. Once determined or otherwise acquired, the contracted navigation limits are stored (or updated) such that they can be used for onboard processing of the navigation display (task 308).

The contracted navigation limits can be associated with the four-dimensional trajectory of the aircraft, and, therefore, correspond to the spatial position and timeline of the flight. For this embodiment, the contracted navigation limits include: contracted altitude limits (at least one upper altitude limit and/or at least one lower altitude limit); contracted lateral cross-track limits (at least one port side cross-track limit and/or at least one starboard side cross-track limit); and contracted temporal limits associated with at least one waypoint of the planned trajectory (at least one late time limit and/or at least one early time limit).

One or more of the contracted navigation limits can be updated during operation of the aircraft, if so desired. Accordingly, the process 300 checks whether a contracted navigation limit is to be updated (query task 310). If so, then the process 300 returns to task 304 to establish (or maintain) communication with the third party navigation controller, determine the updated limit (task 306), and store the updated limit (task 308). Thus, the contracted navigation limits need not be fixed during flight, and the process 300 could update one or more of the contracted navigation limits when needed.

Figure 4:
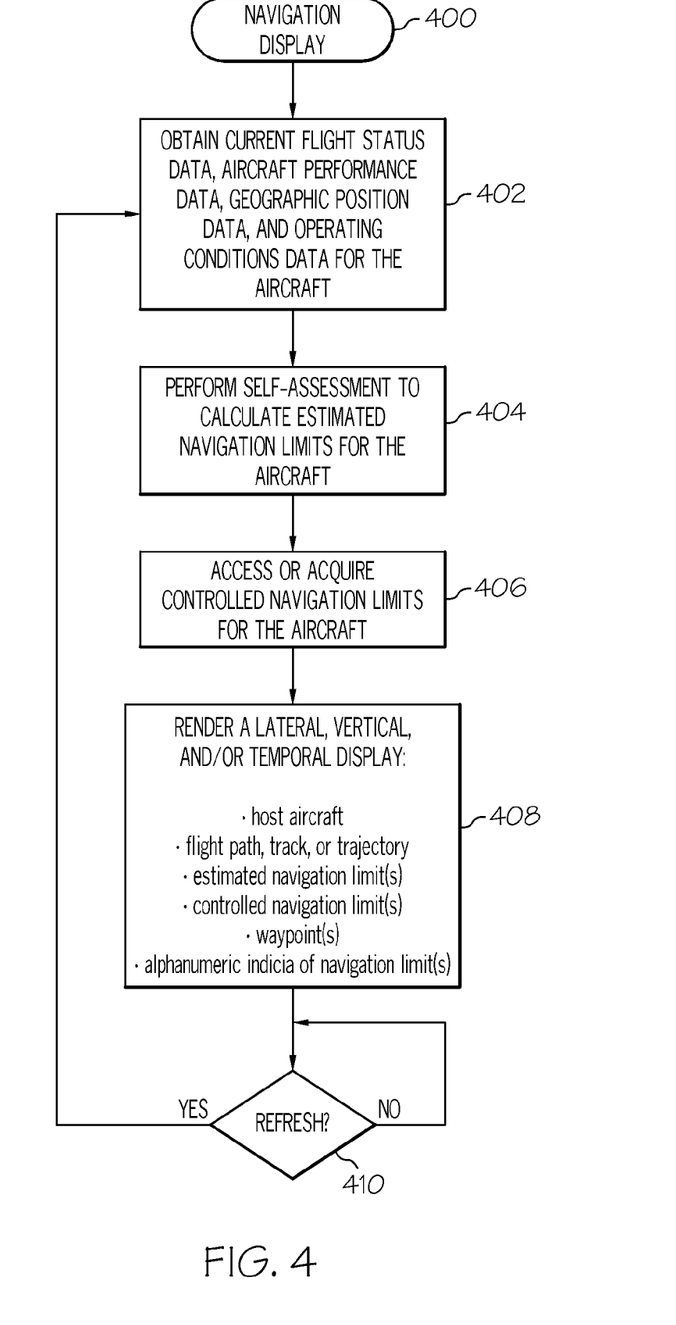
FIG. 4 is a flow chart that illustrates an exemplary embodiment of a navigation display process.

FIG. 4 is a flow chart that illustrates an exemplary embodiment of a navigation display process 400, which may be performed by a display system such as the display system 200. The various tasks performed in connection with the process 400 may be performed by software, hardware, firmware, or any combination thereof. For illustrative purposes, the following description of process 400 may refer to elements mentioned above in connection with FIGS. 1 and 2. In practice, portions of process 400 may be performed by different elements of the described system, e.g., a processor, a display element, or a data communication module. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

In practice, the process 400 can be performed in a virtually continuous manner at a relatively high refresh rate. For example, an iteration of the process 400 could be performed once every two seconds (or less) such that the navigation display will be updated in real-time or substantially real time in a dynamic manner. This particular embodiment of the process 400 begins by obtaining certain types of information and data associated with the host aircraft (task 402). More specifically, task 402 obtains, without limitation, the current flight status data of the host aircraft, performance and/or operating status data of the host aircraft, geographic position data for the host aircraft, and data related to the operating conditions (e.g., weather data, temperature data, etc.). In practice, the process 400 can obtain this data from one or more subsystems onboard the aircraft. The aircraft may also perform a self-assessment to calculate its estimated navigation limits (task 404), where the estimated navigation limits are responsive to or otherwise influenced by the current operating conditions and performance characteristics of the host aircraft. As explained previously, the estimated navigation limits represent the self-assessed navigation accuracy of the host aircraft, relative to the planned flight trajectory.

The estimated navigation limits can be associated with the four-dimensional trajectory of the aircraft. Thus, the estimated navigation limits correspond to the spatial position and timeline of the flight. For this embodiment, the estimated navigation limits include: estimated altitude limits (at least one upper altitude limit and/or at least one lower altitude limit); estimated lateral cross-track limits (at least one port side cross-track limit and/or at least one starboard side cross-track limit); and estimated temporal limits associated with at least one waypoint of the planned trajectory (at least one late time limit and/or at least one early time limit).

This embodiment of the process 400 considers both estimated navigation limits and contracted navigation limits. Accordingly, the process 400 may obtain, access, or otherwise acquire one or more contracted navigation limits for the aircraft (task 406). As explained previously, the contracted navigation limits represent specified navigation accuracy as mandated by some third party (relative to the aircraft and the flight crew) entity or agency, such as a third party navigation controller. In practice, task 406 may be associated with the retrieval of previously negotiated contracted navigation limits from an onboard memory element of the aircraft.

The process 400 continues by generating and rendering an appropriate navigation display on at least one onboard display element of the host aircraft (task 408). The navigation display may include, without limitation: a lateral (top view) display; a vertical profile display; a temporal display; or any combination thereof. The navigation display will include a number of graphical features, visual elements, and graphical representations that are intended for viewing by the pilot and/or other flight crew members. For example, the navigation display might include, without limitation, graphical representations of: the host aircraft; the planned travel route, which may be depicted as a flight path, a flight track, a flight trajectory, or the like; at least one estimated navigation limit; at least one contracted navigation limit; one or more waypoints; alphanumeric or other textual indicia of the navigation limits; an altitude or flight level scale; a lateral distance scale; etc. Notably, certain graphical characteristics of the display will be determined by or otherwise influenced by the current flight status data of the host aircraft, which changes during flight. Accordingly, if it is time to refresh the navigation display (query task 410), then the process 400 returns to task 402 to obtain updated data and refresh the navigation display in response to the updated data. Thus, the content of the navigation display (including the graphical representations of the planned travel route, the estimated navigation limits, and the contracted navigation limits) is dynamically updated during operation of the host aircraft and as the host aircraft continues its flight path.

It should be appreciated that at any given time the navigation display may include some but not all of the graphical features listed above. For example, it may be possible to switch the display mode such that only the estimated navigation limits are shown, only the contracted navigation limits are shown, or both estimated and contracted navigation limits are shown. As another example, it may be possible to selectively enable/disable the lateral, vertical, and/or temporal displays. As yet another example, it may be possible to temporarily hide textual or alphanumeric labels so that they do not appear on the navigation display.

Figure 5:
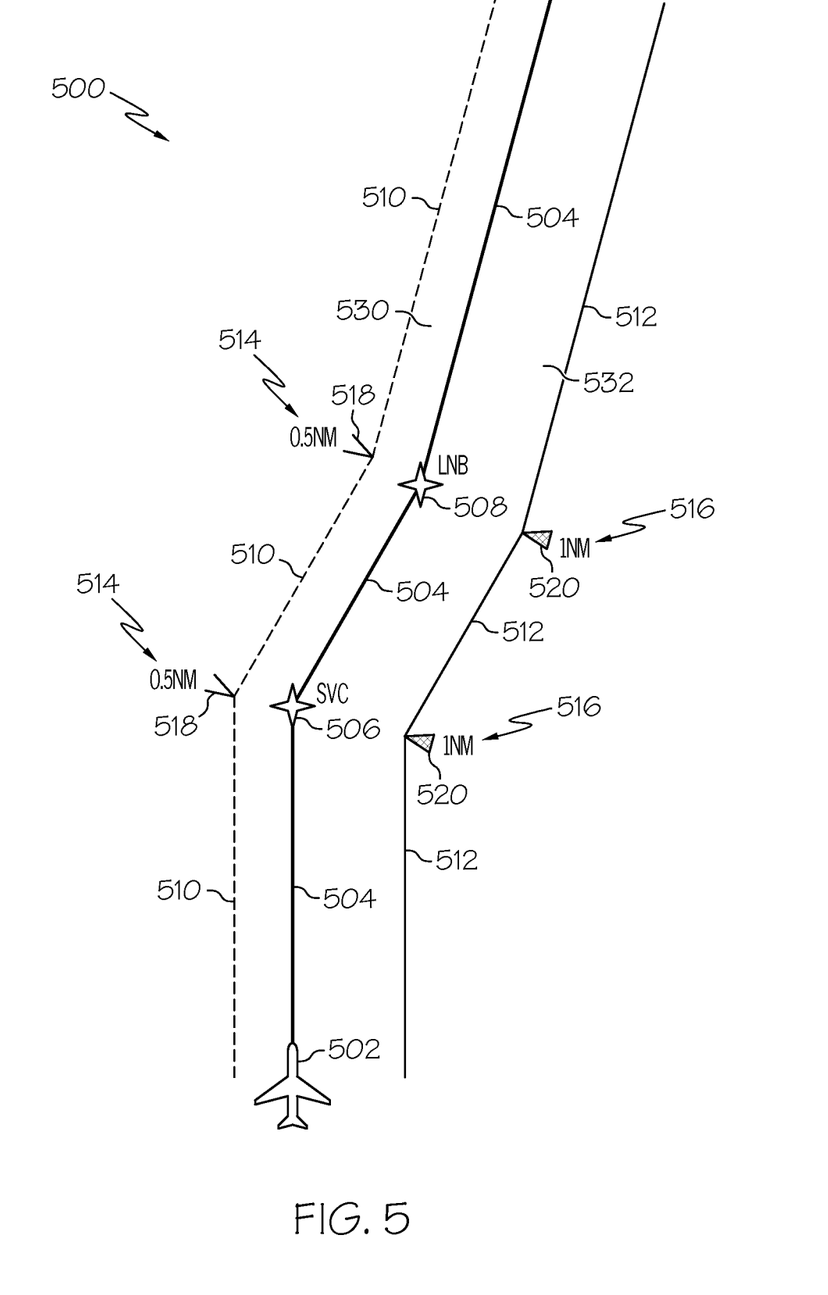
FIG. 5 is a schematic representation of a portion of an exemplary navigation display that includes cross-track limits.

FIG. 5 is a schematic representation of a portion of an exemplary navigation display 500 that includes cross-track limits. The illustrated portion of the navigation display 500 corresponds to a lateral (top-down) view, and it includes graphical representations of the following features, without limitation: a host aircraft 502; a planned track 504 for the host aircraft; a first waypoint 506 along the planned track 504 (labeled "SVC" in FIG. 5); a second waypoint 508 along the planned track 504 (labeled "LNB" in FIG. 5); a line 510 that represents an estimated cross-track limit for the host aircraft; a line 512 that represents a contracted cross-track limit for the host aircraft; alphanumeric indicia 514 of the estimated cross-track limit; alphanumeric indicia 516 of the contracted cross-track limit; markers 518 corresponding to the alphanumeric indicia 514; and markers 520 corresponding to the alphanumeric indicia 516.

The planned track 504 represents the intended or ideal flight track of the aircraft, and the navigation limits represent respective amounts of deviation from the planned track 504. Thus, the line 510 is displayed adjacent to the graphical representation of the planned track 504, preferably in a scaled manner that visually conveys the distance relative to the planned track 504. For this example, the line 510 corresponds to an estimated cross-track limit of 0.5 nautical miles relative to the planned track (typically measured perpendicular to the planned track 504). Although not shown in FIG. 5, the navigation display 500 may also include another line (on the other side of the planned track 504) that indicates the starboard side estimated cross-track limit. Moreover, the navigation display 500 could display either one of the two estimated cross-track limits or both (and the manner in which the estimated cross-track limits are displayed could be selected by the user). Notably, the port side estimated cross-track limit and the starboard side estimated cross-track limit need not be symmetrical about the planned track.

Similarly, the line 512 is displayed adjacent to the graphical representation of the planned track 504, preferably in a scaled manner that visually conveys the distance relative to the planned track 504. For this example, the line 512 corresponds to a contracted cross-track limit of 1.0 nautical mile relative to the planned track (typically measured perpendicular to the planned track 504). Although not shown in FIG. 5, the navigation display 500 may also include another line (on the other side of the planned track 504) that indicates the port side contracted cross-track limit. Moreover, the navigation display 500 could display either one of the two contracted cross-track limits or both (and the manner in which the contracted cross-track limits are displayed could be selected by the user). Notably, the port side contracted cross-track limit (represented by the line and the starboard side contracted cross-track limit need not be symmetrical about the planned track.

It should be appreciated that a cross-track limit need not be parallel to the planned track. Thus, in FIG. 5, the line 510 need not be parallel to the planned track 504, and the line 512 need not be parallel to the planned track 504. Moreover, the perpendicular distance from the planned track 504 to a cross-track limit need not be constant over the course of the entire flight. Indeed, the perpendicular distance can be different in different legs of the flight. Furthermore, the planned track and any of the cross-track limits need not be straight lines or formed of straight line segments (as depicted in FIG. 5). Accordingly, the planned track 504, the line 510, and/or the line 512 could be curved or include any number of curved segments.

In certain implementations, the line 510 and the line 512 are rendered using visually distinguishable characteristics relative to each other. Moreover, the line 510 and the line 512 could be rendered using visually distinguishable characteristics relative to the planned track 504. In this regard, the different visually distinguishable characteristics may correspond to any of the following characteristics, individually or in any combination thereof: different colors; different brightness; different transparency levels; different translucency levels; different line patterns; different line thickness; different shapes; different sizes; different flicker patterns; different focus levels; different sharpness levels; different clarity levels; and different contrast levels. For this example, the line 510 is rendered as a dashed or broken line, while the line 512 is rendered as a solid line.

For this example, the alphanumeric indicia 514, 516 are rendered such that they flank the waypoints 506, 508. In this manner, the alphanumeric indicia 514, 516 specify the cross-track limits at the waypoints 506, 508. This correlation makes it easier for the flight crew to identify constraints and restrictions corresponding to waypoints along the flight path. In certain embodiments, the alphanumeric indicia 514 (for the estimated cross-track limit) is rendered using visually distinguishable characteristics, relative to the alphanumeric indicia 516 (for the contracted cross-track limit). Likewise, the markers 518 and the markers 520 can be rendered using visually distinguishable characteristics. For this example, the markers 518 are rendered as open-ended or unshaded triangles, while the markers 520 are rendered as closed or shaded triangles. The use of visually distinguishable characteristics for the alphanumeric indicia 514, 516 and the markers 518, 520 makes it easy for the flight crew to quickly determine which graphical features relate to estimated navigation limits and which graphical features relate to contracted navigation limits.

The navigation display 500 includes an area 530 defined between the planned track 504 and the line 510, and another area 532 defined between the planned track 504 and the line 512. In certain deployments, the area 530 is rendered in a visually distinguishable manner relative to the area 532. For example, the area 530 (which corresponds to the estimated cross-track limit) could be filled using one color or pattern, and the area 532 (which corresponds to the contracted cross-track limit) could be filled using a different color or pattern.

Figure 6:
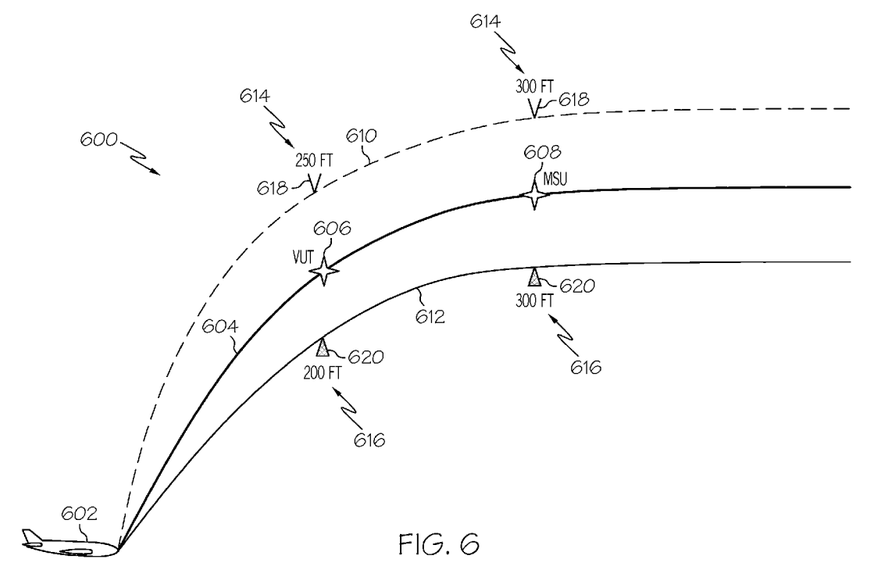
FIG. 6 is a schematic representation of a portion of an exemplary navigation display that includes altitude limits.

FIG. 6 is a schematic representation of a portion of an exemplary navigation display 600 that includes altitude limits. The illustrated portion of the navigation display 600 corresponds to a vertical profile view, and it includes graphical representations of the following features, without limitation: a host aircraft 602; a planned trajectory 604 for the host aircraft; a first waypoint 606 along the planned trajectory 604 (labeled "VUT" in FIG. 6); a second waypoint 608 along the planned trajectory 604 (labeled "MSU" in FIG. 6); a line 610 that represents an estimated altitude limit for the host aircraft; a line 612 that represents a contracted altitude limit for the host aircraft; alphanumeric indicia 614 of the estimated altitude limit; alphanumeric indicia 616 of the contracted altitude limit; markers 618 corresponding to the alphanumeric indicia 614; and markers 620 corresponding to the alphanumeric indicia 616.

The planned trajectory 604 represents the intended or ideal flight trajectory of the aircraft, and the altitude limits represent respective amounts of deviation from the planned trajectory. Thus, the line 610 is displayed adjacent to the graphical representation of the planned trajectory 604, preferably in a scaled manner that visually conveys the distance relative to the planned trajectory 604. For this example, the line 610 corresponds to an estimated altitude limit of +250 feet at the waypoint VUT, and to an estimated altitude limit of +300 feet at the waypoint MSU (these altitude limits are typically expressed as the vertical distance to the planned trajectory 604). Although not shown in FIG. 6, the navigation display 600 may also include another line (below the planned trajectory 604) that indicates a lower estimated altitude limit. Moreover, the navigation display 600 could display either one of the two estimated altitude limits or both (and the manner in which the estimated altitude limits are displayed could be selected by the user). Notably, the upper and lower estimated altitude limits need not be symmetrical about the planned trajectory, and they need not be constant for all waypoints along the planned trajectory.

Similarly, the line 612 is displayed adjacent to the graphical representation of the planned trajectory 604, preferably in a scaled manner that visually conveys the distance relative to the planned trajectory 604. For this example, the line 612 corresponds to a contracted altitude limit of −200 feet at the waypoint VUT, and to a contracted altitude limit of −300 feet at the waypoint MSU. Although not shown in FIG. 6, the navigation display 600 may also include another line (above the planned trajectory 604) that indicates an upper contracted altitude limit. Moreover, the navigation display 600 could display either one of the two contracted altitude limits or both (and the manner in which the contracted altitude limits are displayed could be selected by the user). Notably, the upper and lower contracted altitude limits need not be symmetrical about the planned trajectory, and they need not be constant for all waypoints along the planned trajectory.

The information conveyed by the alphanumeric indicia 614, 616 and the markers 618, 620 is similar to that described above for the navigation display 500 (although in the context of altitudes rather than lateral distances). Accordingly, the alphanumeric indicia 614, 616 and the markers 618, 620 will not be redundantly described in detail here. Moreover, certain graphical features of the navigation display 600 can be rendered using visually distinguishable characteristics, as explained above with reference to the navigation display 500.

Figures 7, 8:
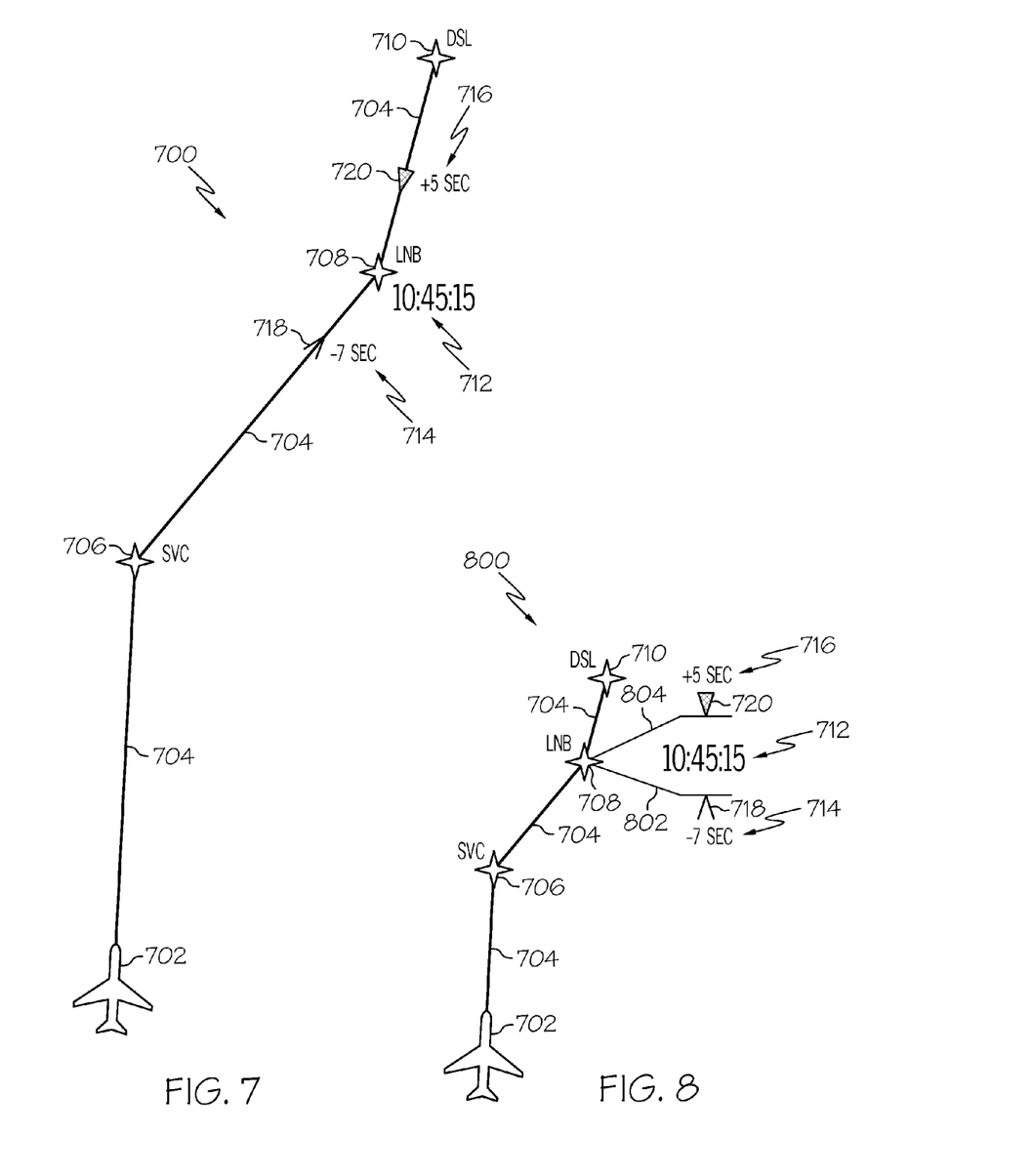
FIGS. 7 and 8 are schematic representations of a portion of an exemplary navigation display that includes temporal limits.

FIG. 7 is a schematic representation of a portion of an exemplary navigation display 700 that includes temporal limits. The illustrated portion of the navigation display 700 corresponds to a lateral (top-down) view, and it includes graphical representations of the following features, without limitation: a host aircraft 702; a planned track 704 for the host aircraft; a first waypoint 706 along the planned track 704 (labeled "SVC" in FIG. 7); a second waypoint 708 along the planned track 704 (labeled "LNB" in FIG. 7); a third waypoint 710 along the planned track 704 (labeled "DSL" in FIG. 7); an arrival time 712 for the waypoint LNB; an estimated temporal limit 714 relative to the arrival time for the waypoint LNB; a contracted temporal limit 716 relative to the arrival time for the waypoint LNB; a marker 718 corresponding to the estimated temporal limit 714; and a marker 720 corresponding to the contracted temporal limit 716. Although not shown in FIG. 7, the waypoint SVC and/or the waypoint DSL may also have corresponding indicia of arrival times, estimated temporal limits, contracted temporal limits, markers, or any combination thereof.

The arrival time 712, which is preferably displayed near its respective waypoint 708, may represent the planned or intended arrival time at the waypoint LNB or it may represent an approximate arrival time that has been computed by an onboard subsystem of the host aircraft, by the ATC, or by some other system or device that is in communication with the host aircraft. In this regard, the arrival time 712 could be static or dynamic, depending upon the implementation. This example assumes that the arrival time 712 (10:45:15) represents a self-assessed time estimate that is based upon the current flight status, environmental, and operating conditions data. Alternatively, the arrival time 712 could be constrained or controlled as currently implemented in some systems.

The estimated temporal limit 714 is displayed near the waypoint 708, for ease of understanding and context. In this regard, if the value of the estimated temporal limit is negative (corresponding to a time before the arrival time 712), then the estimated temporal limit 714 (and/or its associated marker 718) is displayed "before" the waypoint 708. FIG. 7 depicts a scenario where the estimated temporal limit 714 is −7 seconds relative to the estimated arrival time. In contrast, if the value of the estimated temporal limit is positive (corresponding to a time after the arrival time 712), then the estimated temporal limit 714 (and/or its associated marker 718) is displayed "after" the waypoint 708. In certain implementations, the distance between the waypoint 708 and the estimated temporal limit 714 (and/or its associated marker 718) is scaled such that the distance conveys the amount of time defined by the estimated temporal limit 714. Thus, if the magnitude of the estimated temporal limit value is relatively high, then the distance will be relatively long. In contrast, if the magnitude of the estimated temporal limit value is relatively low, then the distance will be relatively short.

The navigation display 700 includes a lower estimated temporal limit 714 (which may also be referred to as an early temporal limit or a negative temporal limit). Although not shown in FIG. 7, the navigation display 700 may also include an upper estimated temporal limit (rendered on the other side of the waypoint 708) that indicates a positive time differential relative to the arrival time 712. As another example, the navigation display 700 could display an estimated temporal limit range (where the entire range includes negative values only, positive values only, or spans negative and positive values). Notably, the magnitudes of the upper and lower estimated temporal limits need not be equal. Moreover, the navigation display 700 could display a lower estimated temporal limit, an upper estimated temporal limit, or both (and the manner in which the estimated temporal limits are displayed could be selected by the user).

The contracted temporal limit 716 is also displayed near the waypoint 708. As explained above for the estimated temporal limit 714, the rendered position of the contracted temporal limit 716 will be influenced by the magnitude of its value and whether the temporal limit defines a positive or negative time differential relative to the arrival time 712. Furthermore, the navigation display 700 could display a lower contracted temporal limit, an upper contracted temporal limit, or both (and the manner in which the contracted temporal limits are displayed could be selected by the user). As mentioned above for the estimated temporal limits, the navigation display 700 could display a range of contracted temporal limits (positive values, negative values, or both). For the illustrated example, the contracted temporal limit 716 is +5 seconds relative to the estimated arrival time.

In certain embodiments, estimated temporal limits, contracted temporal limits, and their related markers can be rendered using visually distinguishable characteristics, as explained above with reference to the navigation display 500. Moreover, positive and negative temporal limits could be displayed in a visually distinguishable manner. For example, estimated temporal limits could be rendered using one color scheme, and contracted temporal limits could be rendered using a different color scheme.

If the overall scale or size of the navigation display 700 is relatively small, it may be difficult to legibly and clearly display all of the temporal limits of interest, especially if displayed waypoints are closely spaced relative to each other. Accordingly, the display system may be suitably configured to support different display modes, which could be automatically or manually selected as needed. For example, FIG. 8 is a schematic representation of a portion of an exemplary navigation display 800 that includes temporal limits rendered in a more compact manner relative to the navigation display 700. The navigation display 800 includes many features and characteristics that are identical, similar, or equivalent to counterpart features and characteristics of the navigation display 700. For the sake of brevity, these common features and characteristics will not be redundantly described here.

The rendered distances between the waypoints 706, 708, 710 on the navigation display 800 are less than the rendered distances on the navigation display 700. This difference could be the result of different scaling, different actual distance between the waypoints, "shrinking" or "expanding" to accommodate the physical screen size, or the like. The compact nature of the navigation display 800 results in less available space for the rendering of the temporal limits. Consequently, the navigation display 800 uses callout lines 802, 804 associated with the estimated temporal limit 714 and the contracted temporal limit 716, respectively. These callout lines 802, 804 originate at or near the waypoint 708 and extend in an appropriate manner to accommodate the display of the temporal limits 714, 716. For this example, the arrival time 712 is displayed between the callout lines 802, 804, although it could be displayed at other locations on the navigation display 800.

Figure 9:
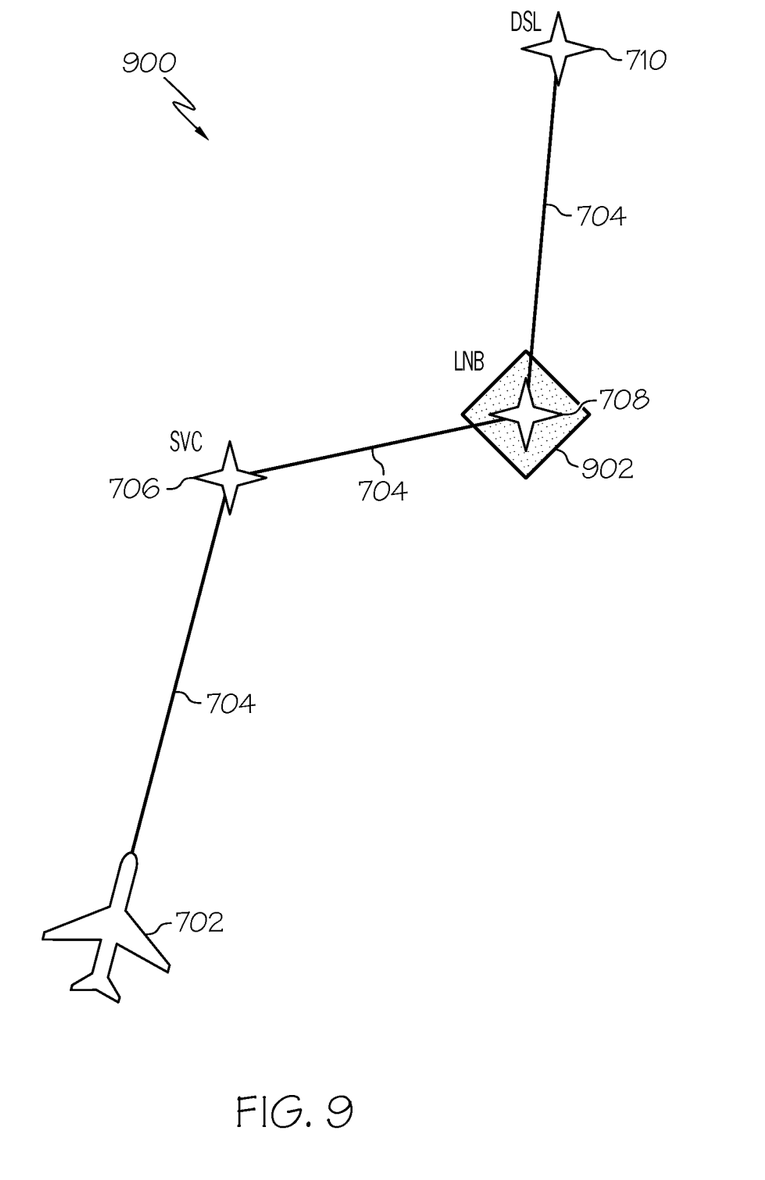
FIG. 9 is a schematic representation of a portion of an exemplary navigation display that includes a graphical user interface feature for changing display modes.

FIG. 9 is a schematic representation of a portion of an exemplary navigation display 900 that includes a graphical user interface feature for changing display modes. The navigation display 900 includes many features and characteristics that are identical, similar, or equivalent to counterpart features and characteristics of the navigation display 700. For the sake of brevity, these common features and characteristics will not be redundantly described here.

FIG. 9 depicts a state of the navigation display 900 where temporal limits are disabled or otherwise hidden from view. This type of uncluttered display mode may be desirable when the aircraft is relatively far away from the waypoint of interest, e.g., the waypoint 708. Although hidden from view, the temporal limits can be enabled or otherwise activated by selecting, hovering over, or otherwise interacting with an active graphical user interface element 902. For this embodiment, the graphical user interface element 902 is rendered as a highlighted diamond (or any desired shape or icon) on or near the waypoint 708. The user can manipulate a cursor or other graphical pointing device to select and "click" on the graphical user interface element 902. In this regard, if the graphical user interface element 902 is selected, the navigation display 900 changes modes and renders the estimated temporal limits, the contracted temporal limits, or both (see FIG. 7 and FIG. 8). Although this switchable display mode is particularly suitable for use with the temporal display, an equivalent feature could be implemented for a lateral display and/or for a vertical profile display (see FIG. 5 and FIG. 6).

Figure 10:
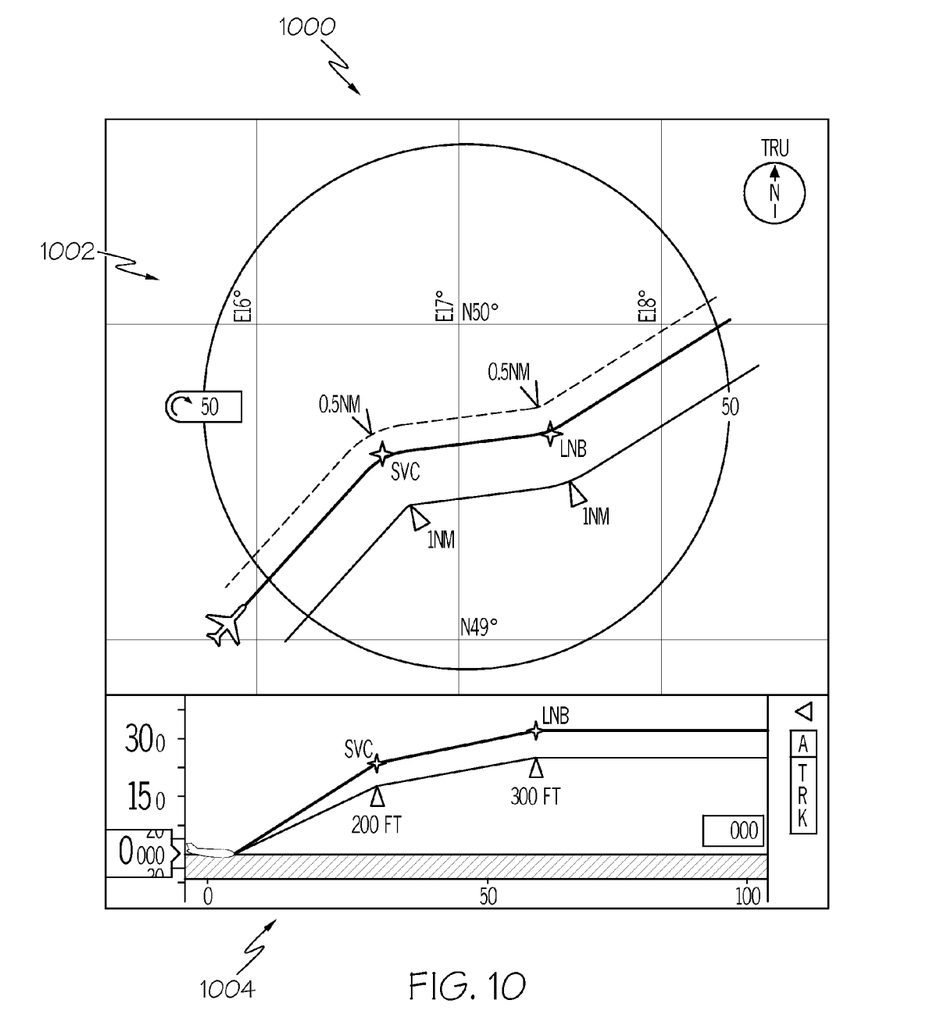
FIG. 10 is a schematic representation of an exemplary navigation display that incorporates a lateral display view and a vertical profile (altitude) display view.

In a cockpit deployment, a single display element or screen could be used to render one or more of: a lateral display; a vertical profile display; and a temporal display (with or without navigation limits as described above). In this regard, FIG.

10 is a schematic representation of an exemplary navigation display 1000 that incorporates a lateral display 1002 and a vertical profile display 1004. The individual characteristics and display features of the lateral display 1002 and the vertical profile display 1004 may be similar to those described above with reference to FIG. 5 and FIG. 6. The navigation display 1000 is but one example of how multiple display views can be merged together for rendering on a single display. This enables the pilot and flight crew to concurrently view cross-track limits and altitude limits relative to approaching waypoints and relative to the planned travel route.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of displaying navigation limits for a planned travel route of a vehicle, the method comprising:
    calculating estimated altitude limits for the vehicle using an onboard subsystem of the vehicle, the estimated altitude limits representing self-assessed navigation accuracy of the vehicle relative to the planned travel route;
    acquiring with a data communication module contracted altitude limits for the vehicle, the contracted altitude limits representing specified navigation accuracy of the vehicle, relative to the planned travel route, as mandated by a third party navigation controller; and
    rendering, on the onboard display element, a navigation display comprising graphical representations of the planned travel route, the estimated altitude limits, and the contracted altitude limits; and
    wherein the rendering step renders the navigation display such that the navigation display comprises:
        a graphical representation of the estimated altitude limit, displayed adjacent to the graphical representation of the planned travel route; and
        a graphical representation of the contracted altitude limit, displayed adjacent to the graphical representation of the planned travel route.

2. The method of claim 1, wherein the calculating step calculates the estimated altitude limits based upon current operating conditions and performance characteristics of the vehicle.

3. The method of claim 1, wherein:
    the vehicle is an aircraft;
    the estimated altitude limits are associated with at least one waypoint of the planned travel route; and
    the contracted altitude limits are associated with the at least one waypoint of the planned travel route.

4. The method of claim 1, wherein the rendering step renders the estimated altitude limits and the contracted altitude limits using visually distinguishable characteristics.

5. The method of claim 1, wherein the rendering step renders alphanumeric indicia of the estimated altitude limits and alphanumeric indicia of the contracted altitude limits.

6. The method of claim 5, wherein the rendering step renders the alphanumeric indicia of the estimated altitude limits and the alphanumeric indicia of the contracted altitude limits using visually distinguishable characteristics.

7. The method of claim 1 further comprising:
    calculating estimated cross-track limits for the vehicle using the onboard subsystem of the vehicle, the estimated cross-track limits representing self-assessed navigation accuracy of the vehicle relative to the planned travel route;
    acquiring contracted cross-track limits for the vehicle, the contracted cross-track limits representing specified navigation accuracy of the vehicle, relative to the planned travel route, as mandated by the third party navigation controller, wherein:
    the rendering step renders the navigation display such that the navigation display comprises:
        a graphical representation of the estimated cross-track limit, displayed adjacent to the graphical representation of the planned travel route; and
        a graphical representation of the contracted cross-track limit, displayed adjacent to the graphical representation of the planned travel route.

8. The method of claim 1, further comprising:
    calculating an estimated temporal limit associated with a waypoint of the planned travel route;
    acquiring a contracted temporal limit associated with the waypoint of the planned travel route, the contracted temporal limit representing specified navigation accuracy of the vehicle, relative to the planned travel route, as mandated by the third party navigation controller, wherein:
    the rendering step renders the navigation display such that the navigation display comprises:
        a graphical representation of the estimated temporal limit, displayed near a graphical representation of the waypoint; and
        a graphical representation of the contracted temporal limit, displayed near the graphical representation of the waypoint.

9. The method of claim 1 further comprising obtaining a planned trajectory for the aircraft, wherein calculating estimated altitude limits for the vehicle using an onboard subsystem of the vehicle comprises calculating estimated altitude limits representing self-assessed navigation accuracy of the aircraft relative to the planned trajectory.

10. The method of claim 9 wherein acquiring contracted altitude limits for the aircraft comprises acquiring contracted altitude limits that represent desired navigation accuracy of the aircraft relative to the planned trajectory as specified by a third party navigation controller.

11. The method of claim 1 further comprising obtaining a planned trajectory for the aircraft, wherein acquiring contracted altitude limits for the aircraft comprises acquiring contracted altitude limits that represent desired navigation accuracy of the aircraft relative to the planned trajectory as specified by a third party navigation controller.

12. The method of claim 1 wherein calculating estimated altitude limits for the vehicle using an onboard subsystem of the vehicle comprises calculating at least one estimated upper altitude limit and at least one estimated lower altitude limit, and wherein acquiring contracted altitude limits for the vehicle comprises acquiring at least one contracted upper altitude limit and at least one contracted lower altitude limit.

13. A method of displaying navigation limits for a planned travel route of a vehicle, the method comprising:
- calculating estimated temporal limits, each temporal limit associated with a respective waypoint of the planned travel route for the vehicle, using an onboard subsystem of the vehicle, the estimated temporal limit representing self-assessed navigation accuracy of the vehicle relative to the planned travel route;
- acquiring with a data communication module contracted temporal limits for the vehicle, each contracted temporal limit representing specified navigation accuracy of the vehicle, relative to the planned travel route, as mandated by a third party navigation controller;
- rendering, on the onboard display element, a navigation display comprising graphical representations of the planned travel route, the estimated temporal limits, and the contracted temporal limits; and
- wherein the vehicle is an aircraft, wherein the method further comprises obtaining a planned trajectory for the aircraft, wherein calculating estimated temporal limits for the vehicle comprises calculating estimated temporal limits representing self-assessed navigation accuracy of the aircraft relative to the planned trajectory, and wherein acquiring contracted temporal limits for the aircraft comprises acquiring contracted temporal limits that represent desired navigation accuracy of the aircraft relative to the planned trajectory as specified by a third party navigation controller.

14. The method of claim 13 further comprising:
- calculating estimated cross-track limits for the vehicle using the onboard subsystem of the vehicle, the estimated cross-track limits representing self-assessed navigation accuracy of the vehicle relative to the planned travel route;
- acquiring contracted cross-track limits for the vehicle, the contracted cross-track limits representing specified navigation accuracy of the vehicle, relative to the planned travel route, as mandated by the third party navigation controller, wherein:
- the rendering step renders the navigation display such that the navigation display comprises:
  - a graphical representation of the estimated cross-track limit, displayed adjacent to the graphical representation of the planned travel route; and
  - a graphical representation of the contracted cross-track limit, displayed adjacent to the graphical representation of the planned travel route.

15. A method of displaying navigation limits for a planned travel route of a vehicle, the method comprising:
- calculating estimated cross-track limits for the vehicle using an onboard subsystem of the vehicle, the estimated cross-track limits representing self-assessed navigation accuracy of the vehicle relative to the planned travel route;
- acquiring with a data communication module contracted cross-track limits for the vehicle, the contracted cross-track limits representing specified navigation accuracy of the vehicle, relative to the planned travel route, as mandated by a third party navigation controller;
- rendering, on the onboard display element, a navigation display comprising graphical representations of the planned travel route, the estimated cross-track limits, and the contracted cross-track limits; and
- obtaining a planned trajectory for the aircraft, wherein calculating estimated cross-track limits for the vehicle comprises calculating estimated cross-track limits representing self-assessed navigation accuracy of the aircraft relative to the planned trajectory, and wherein acquiring contracted cross-track limits for the aircraft comprises acquiring contracted cross-track limits that represent desired navigation accuracy of the aircraft relative to the planned trajectory as specified by a third party navigation controller.

16. The method of claim 15, wherein:
- the vehicle is an aircraft;
- the estimated cross-track limits are associated with at least one waypoint of the planned travel route; and
- the contracted cross-track limits are associated with the at least one waypoint of the planned travel route.

\* \* \* \* \*